(12) United States Patent
Cleodolphi et al.

(10) Patent No.: US 12,457,923 B2
(45) Date of Patent: Nov. 4, 2025

(54) SYSTEM AND METHOD FOR ESTIMATING CROP YIELD FOR AN AGRICULTURAL HARVESTER USING A MACHINE-LEARNED MODEL

(71) Applicant: CNH Industrial America LLC, New Holland, PA (US)

(72) Inventors: Daenio Cleodolphi, Piracicaba (BR); João Augusto Marcolin Lucca, São Pedro (BR); Matheus Eduardo Dos Santos, Piracicaba (BR); Ricardo Breda Porcelli, Itapira (BR)

(73) Assignee: CNH Industrial America LLC, New Holland, PA (US)

( * ) Notice: Subject to any disclaimer, the term of this patent is extended or adjusted under 35 U.S.C. 154(b) by 245 days.

(21) Appl. No.: 17/976,372

(22) Filed: Oct. 28, 2022

(65) Prior Publication Data
US 2023/0139169 A1 May 4, 2023

(30) Foreign Application Priority Data
Oct. 31, 2021 (BR) ...................... 10 2021 021948 3

(51) Int. Cl.
*A01D 34/00* (2006.01)
*A01D 45/10* (2006.01)

(52) U.S. Cl.
CPC ........... *A01D 34/006* (2013.01); *A01D 45/10* (2013.01)

(58) Field of Classification Search
CPC ....... A01D 34/006; A01D 45/10; A01D 34/00
USPC .......................................................... 701/50
See application file for complete search history.

(56) References Cited

U.S. PATENT DOCUMENTS

| | | | |
|---|---|---|---|
| 7,725,233 B2 * | 5/2010 | Hendrickson ........ | A01B 79/005 180/401 |
| 9,958,302 B2 * | 5/2018 | Mudd .................... | F16K 37/005 |
| 9,961,833 B2 | 5/2018 | Halmann | |
| 11,632,905 B2 * | 4/2023 | Herrmann ............ | A01D 41/127 701/50 |
| 11,946,747 B2 * | 4/2024 | Vandike ............... | G06V 20/188 |
| 12,035,648 B2 * | 7/2024 | Vandike ............... | A01B 69/004 |
| 2019/0146426 A1 | 5/2019 | Blank | |

(Continued)

FOREIGN PATENT DOCUMENTS

| | | |
|---|---|---|
| CN | 211090704 U | 7/2020 |
| WO | WO 2019/044304 A1 | 3/2019 |

*Primary Examiner* — Andrew Joseph Rudy
(74) *Attorney, Agent, or Firm* — Dority & Manning, P.A.

(57) ABSTRACT

In one aspect, a computing system for estimating crop yields for agricultural harvesters. The computing system includes one or more processors, and one or more non-transitory computer-readable media that collectively store a machine-learned yield estimation model configured to receive data associated with one or more operation-related conditions for an agricultural harvester and process the data to determine a yield-related parameter indicative of a crop yield for the agricultural harvester. In addition, the computer-readable media stores instructions that, when executed by the one or more processors, configure the computing system to perform operations, the operations comprising: obtaining the data associated with one or more operation-related conditions; inputting the data into the machine-learned yield estimation model; and receiving a value for the yield-related parameter as an output of the machine-learned yield estimation model.

20 Claims, 7 Drawing Sheets

(56) References Cited

U.S. PATENT DOCUMENTS

2020/0090094 A1 3/2020 Blank
2021/0015045 A1 1/2021 Vandike et al.

\* cited by examiner

SYSTEM AND METHOD FOR ESTIMATING CROP YIELD FOR AN AGRICULTURAL HARVESTER USING A MACHINE-LEARNED MODEL

CROSS-REFERENCE TO RELATED APPLICATIONS

The present application is based upon and claims the right of priority to Brazilian Patent Application No. BR 10 2021 021948 3, filed Oct. 31, 2021, the disclosure of which is hereby incorporated by reference herein in its entirety for all purposes.

FIELD OF THE INVENTION

The present disclosure relates generally to agricultural harvesters, such as sugarcane harvesters, and, more particularly, to systems and methods for estimating crop yield of an agricultural harvester using a machine-learned model.

BACKGROUND OF THE INVENTION

Typically, agricultural harvesters include an assembly of processing equipment for processing harvested crop materials. For instance, within a sugarcane harvester, severed sugarcane stalks are conveyed via a feed roller assembly to a chopper assembly that cuts or chops the sugarcane stalks into pieces or billets (e.g., 6 inch cane sections). The processed crop material discharged from the chopper assembly is then directed as a stream of billets and debris into a primary extractor, within which the airborne debris (e.g., dust, dirt, leaves, etc.) is separated from the sugarcane billets. The separated/cleaned billets then fall into an elevator assembly for delivery to an external storage device.

During operation of the harvester, it is typically desirable to monitor the crop yield as the machine goes through the field. For sugarcane harvesters, existing yield monitoring systems rely upon a sensorized plate positioned within the elevator assembly to estimate the crop yield based on the load sensed thereby as the sugarcane passes over the plate. While such systems are equipped to provide accurate yield data, the various components of the system are quite expensive, thereby rendering the system cost-prohibitive for some users. Moreover, the sensorized plates typically require a significant amount of maintenance, including the time require to remove any dirt, mud, or other materials that have accumulated between the plate and the elevator.

Accordingly, systems and methods for estimating the crop yield for an agricultural harvester that address one or more issues associated with existing systems/methods would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a computing system for estimating crop yields for agricultural harvesters. The computing system includes one or more processors, and one or more non-transitory computer-readable media that collectively store a machine-learned yield estimation model configured to receive data associated with one or more operation-related conditions for an agricultural harvester and process the data to determine a yield-related parameter indicative of a crop yield for the agricultural harvester. In addition, the computer-readable media stores instructions that, when executed by the one or more processors, configure the computing system to perform operations, the operations comprising: obtaining the data associated with one or more operation-related conditions; inputting the data into the machine-learned yield estimation model; and receiving a value for the yield-related parameter as an output of the machine-learned yield estimation model.

In another aspect, the present subject matter is directed to a computer-implemented method for estimating crop yield. The computer-implemented method includes obtaining, by a computing system comprising one or more computing devices, data associated with one or more operation-related conditions for an agricultural harvester; inputting, by the computing system, the data into a machine-learned yield estimation model configured to receive and process the data to determine a yield-related parameter indicative of a crop yield for the agricultural harvester; receiving, by the computing system, a value for the yield-related parameter as an output of the machine-learned yield estimation model; and initiating, by the computing system, a control action for the agricultural harvester based at least in part on the value for the yield-related parameter.

In a further aspect, the present subject matter is directed to an agricultural harvester that includes a frame and a material processing system supported relative to the frame, with the material processing system being configured to process a flow of harvested materials. The harvester also includes a controller comprising one or more processors and one or more non-transitory computer-readable media that collectively store a machine-learned yield estimation model configured to receive data associated with one or more operation-related conditions for the agricultural harvester and process the data to determine a yield-related parameter associated with the harvested materials being directed through the agricultural harvester. The computer readable media also stores instructions that, when executed by the one or more processors, configure the controller to perform operations, the operations comprising: obtaining the data associated with one or more operation-related conditions; inputting the data into the machine-learned yield estimation model; and receiving a value for the yield-related parameter as an output of the machine-learned yield estimation model.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
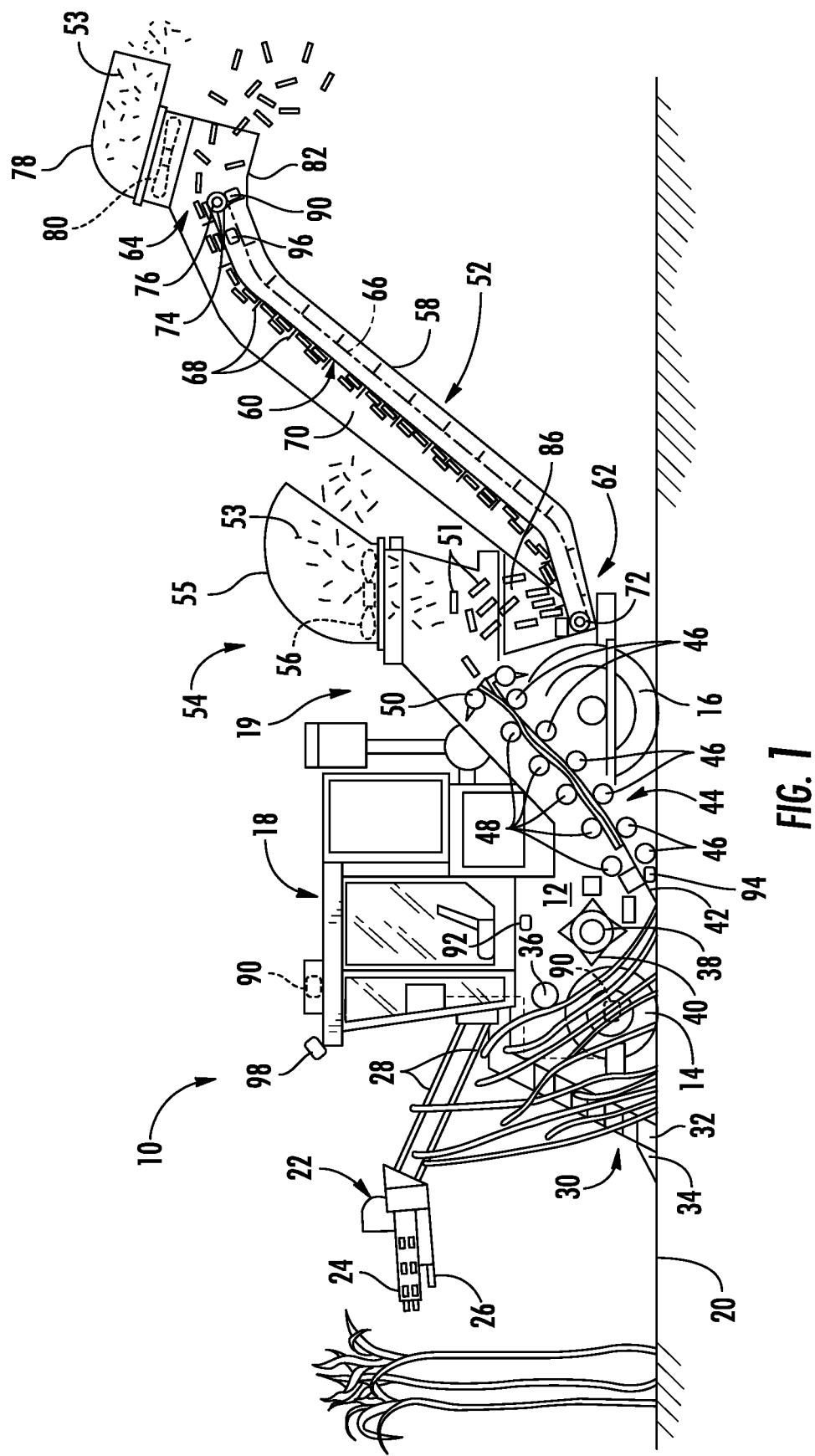
FIG. 1 illustrates a simplified, side view of one embodiment of an agricultural harvester in accordance with aspects of the present subject matter.

Repeat use of reference characters in the present specification and drawings is intended to represent the same or analogous features or elements of the present technology.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to systems and methods estimating crop yields for agricultural harvesters. In particular, the present subject matter is directed to systems and methods that include or otherwise leverage a machine-learned yield estimation model to determine a value for a yield-related parameter indicative of the crop yield for an agricultural harvester based at least in part on input data associated with one or more operation-related conditions for the harvester. For example, the machine-learned yield estimation model can be configured to receive input data and to process the input data to determine a numerical value for the yield-related parameter, such as a numerical value of the mass flow rate of harvested materials through the harvester.

In particular, in one example, a computing system can obtain input data from one or more input devices that is associated with one or more operation-related conditions for an agricultural harvester. For instance, the input device(s) may include one or more onboard sensors configured to monitor one or more parameters and/or conditions associated with the harvester and/or the operation being performed therewith, one or more positioning device(s) for generating position data associated with the location of the harvester, one or more user interfaces for allowing operator inputs to be provided to the system, one or more other internal data sources associated with the harvester, one or more external data sources, and/or the like. The computing system can input the data generated or collected by the input device(s) into a machine-learned yield estimation model and, in response, receive a value for the desired yield-related parameter as an output of the model.

Further, the systems and methods of the present disclosure can initiate one or more control actions based on the estimated yield-related parameter. For instance, the computing system may be configured to provide the operator with a notification or other communication related to the yield-related parameter. Additionally, the computing system may be configured to store the yield-related data for subsequent use and/or compile the yield-related data to allow for the generation of a yield map. Moreover, the computing system may also be configured to automatically control the operation of one or more components of the harvester based on the estimated yield-related parameter. Thus, in certain embodiments, the systems and methods of the present disclosure can enable improved real-time control of an agricultural harvester that measures and accounts for current crop yields during the performance of a harvesting operation.

Through the use of a machine-learned yield estimation model, the systems and methods of the present disclosure can produce yield estimates that exhibit significant accuracy while avoiding many of the issues associated with existing yield monitoring systems (e.g., high costs and substantial downtime). For instance, the input data described herein may, in certain embodiments, be provided from sensors or systems that already exists on the machine, thereby eliminating the need to install expensive, high maintenance sensor systems. Moreover, the accurate crop yield estimates can enable improved and/or more precise control of the harvester, thereby leading to superior agricultural outcomes.

Referring now to the drawings, FIG. 1 illustrates a side view of one embodiment of an agricultural harvester 10 in accordance with aspects of the present subject matter. As shown, the harvester 10 is configured as a sugarcane harvester. However, in other embodiments, the harvester 10 may correspond to any other suitable agricultural harvester known in the art.

As shown in FIG. 1, the harvester 10 includes a frame 12, a pair of front wheels 14, a pair of rear wheels 16, and an operator's cab 18. The harvester 10 may also include a primary source of power (e.g., an engine mounted on the frame 12) which powers one or both pairs of the wheels 14, 16 via a transmission (not shown). Alternatively, the harvester 10 may be a track-driven harvester and, thus, may include tracks driven by the engine as opposed to the illustrated wheels 14, 16. The engine may also drive a hydraulic fluid pump (not shown) configured to generate pressurized hydraulic fluid for powering various hydraulic components of the harvester 10.

The harvester 10 may also include a material processing system 19 incorporating various components, assemblies, and/or sub-assemblies of the harvester 10 for cutting, processing, cleaning, and discharging sugarcane as the cane is harvested from an agricultural field 20. For instance, the material processing system 19 may include a topper assembly 22 positioned at the front end of the harvester 10 to intercept sugarcane as the harvester 10 is moved in the forward direction. As shown, the topper assembly 22 may include both a gathering disk 24 and a cutting disk 26. The gathering disk 24 may be configured to gather the sugarcane stalks so that the cutting disk 26 may be used to cut off the top of each stalk. As is generally understood, the height of the topper assembly 22 may be adjustable via a pair of arms 28 hydraulically raised and lowered, as desired, by the operator.

The material processing system 19 may further include a crop divider 30 that extends upwardly and rearwardly from the field 20. In general, the crop divider 30 may include two spiral feed rollers 32. Each feed roller 32 may include a ground shoe 34 at its lower end to assist the crop divider 30 in gathering the sugarcane stalks for harvesting. Moreover, as shown in FIG. 1, the material processing system 19 may include a knock-down roller 36 positioned near the front wheels 14 and a fin roller 38 positioned behind the knock-down roller 36. As the knock-down roller 36 is rotated, the sugarcane stalks being harvested are knocked down while the crop divider 30 gathers the stalks from agricultural field 20. Further, as shown in FIG. 1, the fin roller 38 may include a plurality of intermittently mounted fins 40 that assist in forcing the sugarcane stalks downwardly. As the fin roller 38 is rotated during the harvest, the sugarcane stalks that have been knocked down by the knock-down roller 36 are separated and further knocked down by the fin roller 38 as the harvester 10 continues to be moved in the forward direction relative to the field 20.

Referring still to FIG. 1, the material processing system 19 of the harvester 10 may also include a base cutter assembly 42 positioned behind the fin roller 38. As is generally understood, the base cutter assembly 42 may include blades (not shown) for severing the sugarcane stalks as the cane is being harvested. The blades, located on the periphery of the assembly 42, may be rotated by a hydraulic motor (not shown) powered by the vehicle's hydraulic system. Additionally, in several embodiments, the blades may be angled downwardly to sever the base of the sugarcane as the cane is knocked down by the fin roller 38.

Moreover, the material processing system 19 may include a feed roller assembly 44 located downstream of the base cutter assembly 42 for moving the severed stalks of sugarcane from base cutter assembly 42 along the processing path of the material processing system 19. As shown in FIG. 1, the feed roller assembly 44 may include a plurality of bottom rollers 46 and a plurality of opposed, top pinch rollers 48. The various bottom and top rollers 46, 48 may be used to pinch the harvested sugarcane during transport. As the sugarcane is transported through the feed roller assembly 44, debris (e.g., rocks, dirt, and/or the like) may be allowed to fall through bottom rollers 46 onto the field 20.

In addition, the material processing system 19 may include a chopper assembly 50 located at the downstream end of the feed roller assembly 44 (e.g., adjacent to the rearward-most bottom and top rollers 46, 48). In general, the chopper assembly 50 may be used to cut or chop the severed sugarcane stalks into pieces or "billets" 51, which may be, for example, six (6) inches long. The billets 51 may then be propelled towards an elevator assembly 52 of the material processing system 19 for delivery to an external receiver or storage device (not shown).

As is generally understood, pieces of debris 53 (e.g., dust, dirt, leaves, etc.) separated from the sugarcane billets 51 may be expelled from the harvester 10 through a primary extractor 54 of the material processing system 19, which is located immediately behind the chopper assembly 50 and is oriented to direct the debris 53 outwardly from the harvester 10. Additionally, an extractor fan 56 may be mounted within the primary extractor 54 for generating a suction force or vacuum sufficient to pick up the debris 53 and force the debris 53 through the primary extractor 54. The separated or cleaned billets 51, heavier than the debris 53 being expelled through the extractor 54, may then fall downward to the elevator assembly 52.

As shown in FIG. 1, the elevator assembly 52 may include an elevator housing 58 and an elevator 60 extending within the elevator housing 58 between a lower, proximal end 62 and an upper, distal end 64. In general, the elevator 60 may include a looped chain 66 and a plurality of flights or paddles 68 attached to and evenly spaced on the chain 66. The paddles 68 may be configured to hold the sugarcane billets 51 on the elevator 60 as the billets are elevated along a top span of the elevator 60 defined between its proximal and distal ends 62, 64. Additionally, the elevator 60 may include lower and upper sprockets 72, 74 positioned at its proximal and distal ends 62, 64, respectively. As shown in FIG. 1, an elevator motor 76 may be coupled to one of the sprockets (e.g., the upper sprocket 74) for driving the chain 66, thereby allowing the chain 66 and the paddles 68 to travel in an endless loop between the proximal and distal ends 62, 64 of the elevator 60.

Moreover, in some embodiments, pieces of debris 53 (e.g., dust, dirt, leaves, etc.) separated from the elevated sugarcane billets 51 may be expelled from the harvester 10 through a secondary extractor 78 of the material processing system 19 coupled to the rear end of the elevator housing 58. For example, the debris 53 expelled by the secondary extractor 78 may be debris remaining after the billets 51 are cleaned and debris 53 expelled by the primary extractor 54. As shown in FIG. 1, the secondary extractor 78 may be located adjacent to the distal end 64 of the elevator 60 and may be oriented to direct the debris 53 outwardly from the harvester 10. Additionally, an extractor fan 80 may be mounted at the base of the secondary extractor 78 for generating a suction force or vacuum sufficient to pick up the debris 53 and force the debris 53 through the secondary extractor 78. The separated, cleaned billets 51, heavier than the debris 53 expelled through the extractor 78, may then fall from the distal end 64 of the elevator 60. Typically, the billets 51 may fall downwardly through an elevator discharge opening 82 of the elevator assembly 52 into an external storage device (not shown), such as a sugarcane billet cart.

During operation, the harvester 10 is traversed across the agricultural field 20 for harvesting sugarcane. After the height of the topper assembly 22 is adjusted via the arms 28, the gathering disk 24 on the topper assembly 22 may function to gather the sugarcane stalks as the harvester 10 proceeds across the field 20, while the cutter disk 26 severs the leafy tops of the sugarcane stalks for disposal along either side of harvester 10. As the stalks enter the crop divider 30, the ground shoes 34 may set the operating width to determine the quantity of sugarcane entering the throat of the harvester 10. The spiral feed rollers 32 then gather the stalks into the throat to allow the knock-down roller 36 to bend the stalks downwardly in conjunction with the action of the fin roller 38. Once the stalks are angled downwardly as shown in FIG. 1, the base cutter assembly 42 may then sever the base of the stalks from field 20. The severed stalks are then, by movement of the harvester 10, directed to the feed roller assembly 44.

The severed sugarcane stalks are conveyed rearwardly by the bottom and top rollers 46, 48, which compress the stalks, make them more uniform, and shake loose debris to pass through the bottom rollers 46 to the field 20. At the downstream end of the feed roller assembly 44, the chopper assembly 50 cuts or chops the compressed sugarcane stalks into pieces or billets 51 (e.g., 6 inch cane sections). The processed crop material discharged from the chopper assembly 50 is then directed as a stream of billets 51 and debris 53 into the primary extractor 54. The airborne debris 53 (e.g., dust, dirt, leaves, etc.) separated from the sugarcane billets is then extracted through the primary extractor 54 using suction created by the extractor fan 56. The separated/ cleaned billets 51 then fall downwardly through an elevator hopper 86 into the elevator assembly 52 and travel upwardly via the elevator 60 from its proximal end 62 to its distal end 64. During normal operation, once the billets 51 reach the distal end 64 of the elevator 60, the billets 51 fall through the elevator discharge opening 82 to an external storage device. If provided, the secondary extractor 78 (with the aid of the extractor fan 80) blows out trash/debris 53 from harvester 10, similar to the primary extractor 54.

It should be appreciated that the harvester 10 may also include various onboard sensors for monitoring one or more operating parameters or conditions of the harvester 10. For instance, the harvester 10 may include or be associated with various different speed sensors 90 for monitoring the speed of the harvester 10, itself, and/or the operating speed of one or more components of the harvester 10. Specifically, in several embodiments, the speed sensors 90 may be used to detect or monitor various different speed-related parameters associated with the harvester 10, including, but not limited to, the ground speed of the harvester 10, the engine speed of the harvester's engine (e.g., engine RPM), the elevator speed of the elevator assembly 52, the rotational speed of the blades of the base cutter assembly 42, the rotational speed of the chopper assembly 50, the rotational speed of the rollers 46, 48 of the feed roller assembly 44, the fan speed associated with the primary extractor 54 and/or the secondary extractor 78, and/or any other suitable operating speeds associated with the harvester 10. For example, as shown in FIG. 1, a first speed sensor 90 is provided in operative association with the elevator assembly 52 (e.g., a rotational speed sensor provided in association with the elevator motor 76) to allow the elevator speed to be continuous monitored, while a second speed sensor 90 (e.g., a wheel speed sensor or a GPS-enabled device) may be provided in operative association with another component of the harvester 10 (e.g., the wheels 14, 16 and/or cab 18) to allow the ground speed of the harvester 10 to be continuously monitored.

Additionally, in several embodiments, the harvester 10 may include or incorporate one or more position sensors 92 used to monitor one or more corresponding position-related parameters associated with the harvester 10. Position-related parameters that may be monitored via the position sensor(s) 92 include, but are not limited to, the cutting height of the base cutter assembly 42, the relative positioning of the bottom and top rollers 46, 48 of the feed roller assembly 44 (e.g., as will be described below with reference to FIG. 2), the vertical travel or position of the chassis or frame 12 of the harvester 10, and/or any other suitable position-related parameters associated with the harvester 10. For instance, as shown in FIG. 1, a position sensor 92 may be mounted to the harvester's frame 12 to monitor the vertical position or travel of the chassis relative to a given reference point.

Moreover, in several embodiments, the harvester 10 may include or incorporate one or more pressure sensors 94 used to monitor one or more corresponding pressure-related parameters associated with the harvester 10. For instance, pressure-related parameters that may be monitored via the pressure sensor(s) 94 include, but are not limited to, the fluid pressures associated with the hydraulic fluid supplied to one or more hydraulic components of the harvester 10, such as the hydraulic motor(s) rotationally driving the base cutter assembly 42 (e.g., the base cutter pressure), the hydraulic motor(s) rotationally driving the chopper assembly 50, and/ or any other suitable pressure-related parameters associated with the harvester 10. For instance, as shown in FIG. 1, a pressure sensor 94 may be provided in operative association with the base cutter assembly 42 to monitor the base cutter pressure.

It should be appreciated that the harvester 10 may also include various other sensors or sensing devices. In one embodiment, the harvester 10 may include or incorporate one or more load sensors 96 (e.g., one or more load cells or sensorized load plates) used to monitor one or more corresponding load-related parameters associated with the harvester 10. For instance, as shown in FIG. 1, one or more load sensors 96 may be provided in operative association with the elevator assembly 52 to allow the weight or mass flow rate of the harvested materials being directed through the elevator to be monitored. Additionally, in one embodiment, the harvester 10 may include or incorporate one or more vision-based or wave-based sensors 98 (e.g., one or more cameras, radar sensors, ultrasound sensors, LIDAR devices, etc.) used to capture sensor data indicative of one or more observable parameters associated with the harvester 10, such as by providing a camera or LIDAR device to allow the potential upcoming crop mass within the field to be estimated based on the received vision-based data or by providing an internally installed camera or radar device to allow sensor data to be captured that is associated with the mass flow of the harvested materials through the material processing system 19. For instance, as shown in FIG. 1, a forward looking vision-based sensor 98 may be installed on the cab 18 with a field of view directed in front of the harvester 10 to allow images or other vision-based data to be captured that provides an indication of the upcoming crop mass within the field.

Figure 2:
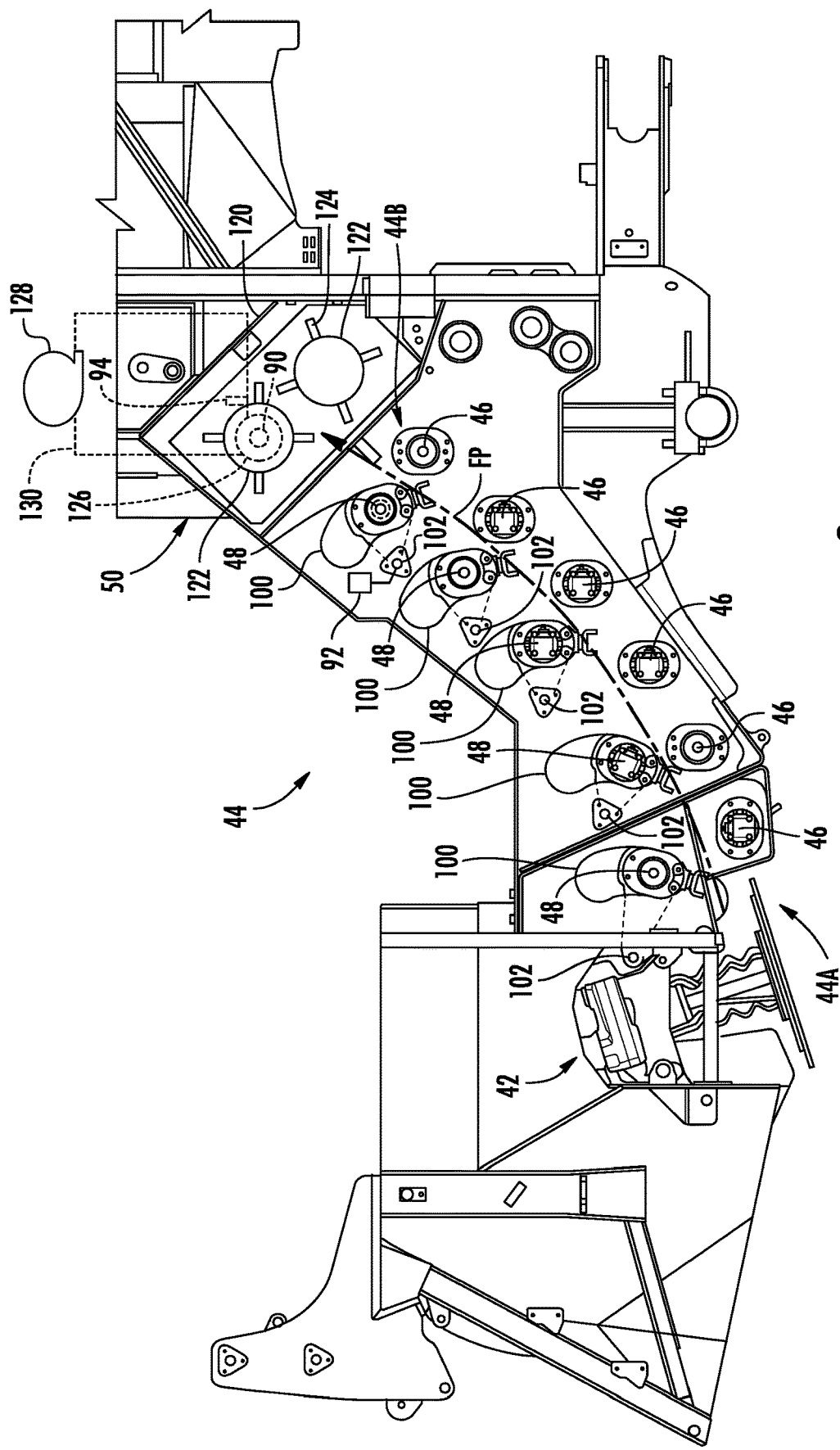
FIG. 2 illustrates a side view of one embodiment of a portion of a material processing system of an agricultural harvester in accordance with aspects of the present subject matter, particularly illustrating one embodiment of a feed roller assembly and a chopper assembly of the material processing system.

Referring now to FIG. 2, a side view of a portion of a material processing system of an agricultural harvester is illustrated in accordance with aspects of the present subject matter, particularly showing a side view of one embodiment of the feed roller assembly 44 and chopper assembly 50 of the material processing system 19 described above with reference to FIG. 1.

As shown in FIG. 2, the feed roller assembly 44 extends between a first end 44A and a second end 44B, with the first end 44A of the feed roller assembly 44 being adjacent the base cutter assembly 42 and the second end 44B of the feed roller assembly 44 being adjacent the chopper assembly 50. As such, the first end 44A of the feed roller assembly 44 is configured to receive harvested materials (e.g., severed sugarcane stalks) from the base cutter assembly 42 and to convey the flow of harvested materials along a flow path FP defined between the bottom and top rollers 46, 48 to the chopper assembly 50 at the second end 44B of the feed roller assembly 44. While the feed roller assembly 44 is shown as having six bottom rollers 46 and five top rollers 48, it should be appreciated that the feed roller assembly 44 may have any other suitable number of bottom and/or top rollers 46, 48.

Figure 3B:
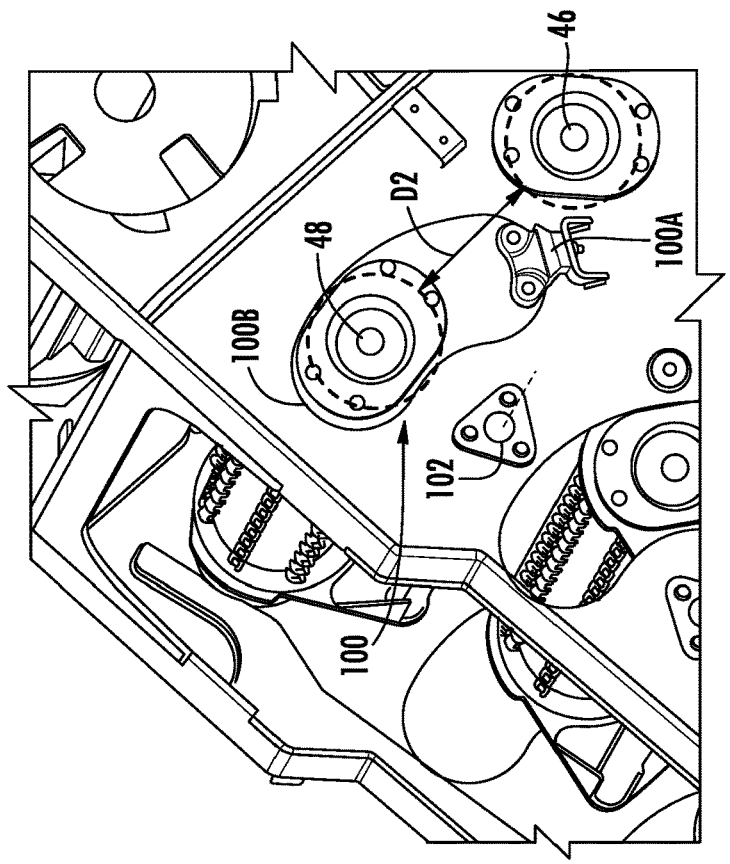
FIGS. 3A and 3B illustrate a detail view of one embodiment of a top roller of a feed roller assembly of an agricultural harvester in accordance with aspects of the present subject matter, particularly illustrating the top roller in a lowered position and in a raised position, respectively.
Figure 3A:
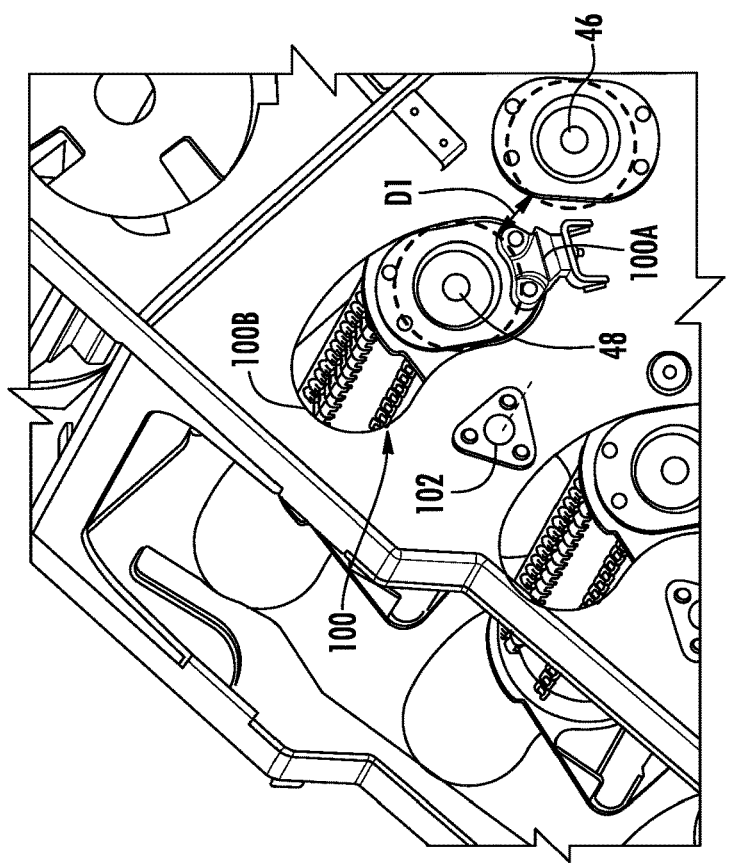

Due to variations in the volume of harvested materials being processed by the material processing system 19, the flow of harvested materials through the feed roller assembly 44 will inherently vary in thickness. As such, one set of the rollers of the feed roller assembly 44 may be configured as floating rollers (with the other set of rollers being configured as fixed or non-floating rollers) such that the spacing between the bottom and top rollers 46, 48 is variable to account for changes in the volume of the harvested materials being directed through the feed roller assembly 44. For instance, in one embodiment, each of the top rollers 48 is movable within a respective slot 100. As particularly shown in FIGS. 3A and 3B, each slot 100 may extend between a first slot end 100A and a second slot end 100B. When the top roller 48 abuts against the first slot end 100A, the top roller 48 is in a lowest position, such that the top roller 48 is spaced by a first distance D1 from the respective bottom roller 46. When the top roller 48 abuts against the second slot end 100B, the top roller 48 is in a highest position, such that the top roller 48 is spaced by a second distance D2 from the respective bottom roller 46. In one embodiment, the first distance D1 is the closest that the top roller 48 may be from the adjacent bottom roller 46 and the second distance D2 is the furthest that the top roller 48 may be from the adjacent bottom roller 46. In some embodiments, the top rollers 48 are pivotable about a respective pivot joint 102 to move within the slot 100 between the first and second slot ends 100A, 100B. For instance, the top roller 48 may be pivoted about the pivot joint 102 between a first angular position, corresponding to the first distance D1, and a second angular position, corresponding to the second distance D2. However, in other embodiments, the top rollers 48 may be configured to move within the slot in any other suitable way. Alternatively, the top rollers 48 may be fixed or non-floating and the bottom rollers 46 may, instead, be movable to allow the spacing between the bottom and top rollers 46, 48 to be varied.

Additionally, as shown in FIG. 2, the chopper assembly 50 may generally include an outer housing 120 and one or more chopper drums 122 rotatably supported within the chopper housing 120. As is generally understood, the chopper drums 122 are configured to be rotatably driven within the housing 120 such that chopper elements 124 extending outwardly from each drum 122 (e.g., blades) cut or chop the harvested materials received from the feed roller assembly 44, thereby generating a stream of processed harvested materials (e.g., including both billets 51 and debris 53) that is discharged from the chopper assembly 50 via an outlet of the housing 120. Additionally, as shown in FIG. 2, a hydraulic motor(s) 126 is provided in association with the chopper drums 122 for rotationally driving the drums 122. The hydraulic motor(s) 126 is, in turn, fluidly coupled to a hydraulic pump 128 of the vehicle's hydraulic system (e.g., via an associated hydraulic circuit 130—shown in dashed lines) such that pressurized hydraulic fluid can be delivered from the pump 128 to rotationally drive the motor(s) 126.

FIG. 2 also illustrates various examples of sensors that may be used to monitor one or more parameters or conditions associated with the harvester 10. For instance, as indicated above, one or more position sensors 92 may be used to monitor one or more position-related parameters associated with the harvester 10, such as by providing a position sensor(s) 92 in association with the feed roller assembly 44 for detecting variations in the spacing between the bottom and top rollers 46, 48. Specifically, in the illustrated embodiment, one or more position sensors 92 may be provided for detecting the displacement of one or more respective top rollers 48 of the feed roller assembly 44, including, for example, the magnitude and/or rate of the displacement. For instance, as shown in FIG. 2, a position sensor 92 is provided in operative association with the furthest downstream top roller 48 of the feed roller assembly 44 to detect the displacement of the roller 48 relative to the adjacent bottom roller 46 as harvested materials are directed through the feed roller assembly 44. In an alternative embodiment in which the bottom rollers 46 are movable and the top rollers 48 are fixed or non-floating, the position sensor(s) 92 may, instead, be configured to detect the displacement of one or more of the bottom rollers 46 as harvested materials are directed through the feed roller assembly 44.

Additionally, as indicative above, one or more pressure sensors 94 may be used to monitor one or more pressure-related parameters associated with the harvester 10, such as by providing a pressure sensor(s) 94 to monitor the fluid pressure associated with the hydraulic motor(s) 126 configured to rotationally drive the chopper drums 122 of the chopper assembly 50. For instance, as shown in FIG. 2, a pressure sensor 94 is provided in fluid communication with the hydraulic circuit 130 coupling the motor 126 to the pump 128 to monitor the fluid pressure of the hydraulic fluid being suppled thereto.

Moreover, as indicative above, one or more speed sensors 90 may be used to monitor one or more speed-related parameters associated with the harvester 10, such as by providing one or more speed sensors 90 to monitor the rotational speed of the feeder rollers 46, 48 and/or the chopper drums 122. For instance, as shown in FIG. 2, a speed sensor 90 may be provided in association with the chopper assembly 50 to monitor the rotational speed of the chopper drums 122, such as by installing the sensor 90 in association with the motor 126 driving the drums 122.

As indicated above, it is generally desirable to monitor a yield-related parameter of an agricultural harvester (e.g., a mass flow rate through the harvester) to allow the operator to gather data associated with the crop yield and evaluate the performance of the harvester. In addition, the yield-related data may also be used to automate certain functions or control actions associated with the harvester, such as to automatically adjust one or more operational settings of one or more harvester components to improve the efficiency and/or performance thereof.

As will be described below, the yield-related parameter of the harvester (e.g., a mass flow rate through the harvester) may be estimated or determined using a machine-learned model that has been trained or otherwise developed to output the yield-related parameter based on a correlation between such parameter and various inputs into the model. For instance, in several embodiments, the inputs into the machine-learned model may include data associated with one or more "operation-related" conditions, which can, include, but are not limited to, operational parameters and settings of the harvester (e.g., sensed or calculated operating parameters or operator-selected settings), vehicle commands for the harvester, vehicle configuration parameters, application-related parameters, field-related parameters, and/or the like. For instance, operation-related condition data may include, but is not limited to, data associated with any one or a combination of engine speed, ground speed, elevator speed, base cutter height, base cutter pressure, chopper speed, chopper pressure, floating roller position or displacement, the vertical position or travel of the chassis or frame, the fan speed associated with the primary and/or secondary extractor, hydraulic motor usage, foilage proportion, base cutter direction (forward or reverse), raising or lowering of the topper assembly, raising or lowering of the suspension, the model/type of the chopper assembly, the size of the elevator assembly, tire/track parameters, the region within which the harvester is operating, farm-specific parameters, time-related parameters (day/night), humidity data, field NDVI data, yield prediction data, soil analysis data, and/or the like. Such data may be, for example: based directly or indirectly on sensor data received from onboard sensors; calculated or determined by the harvester's computing system based on data accessible to such system (e.g., including internally derived or externally derived data); received from the operator (e.g., via a user interface); received from an external source (e.g., a remote server or separate computing device); and/or the like.

Figure 4:
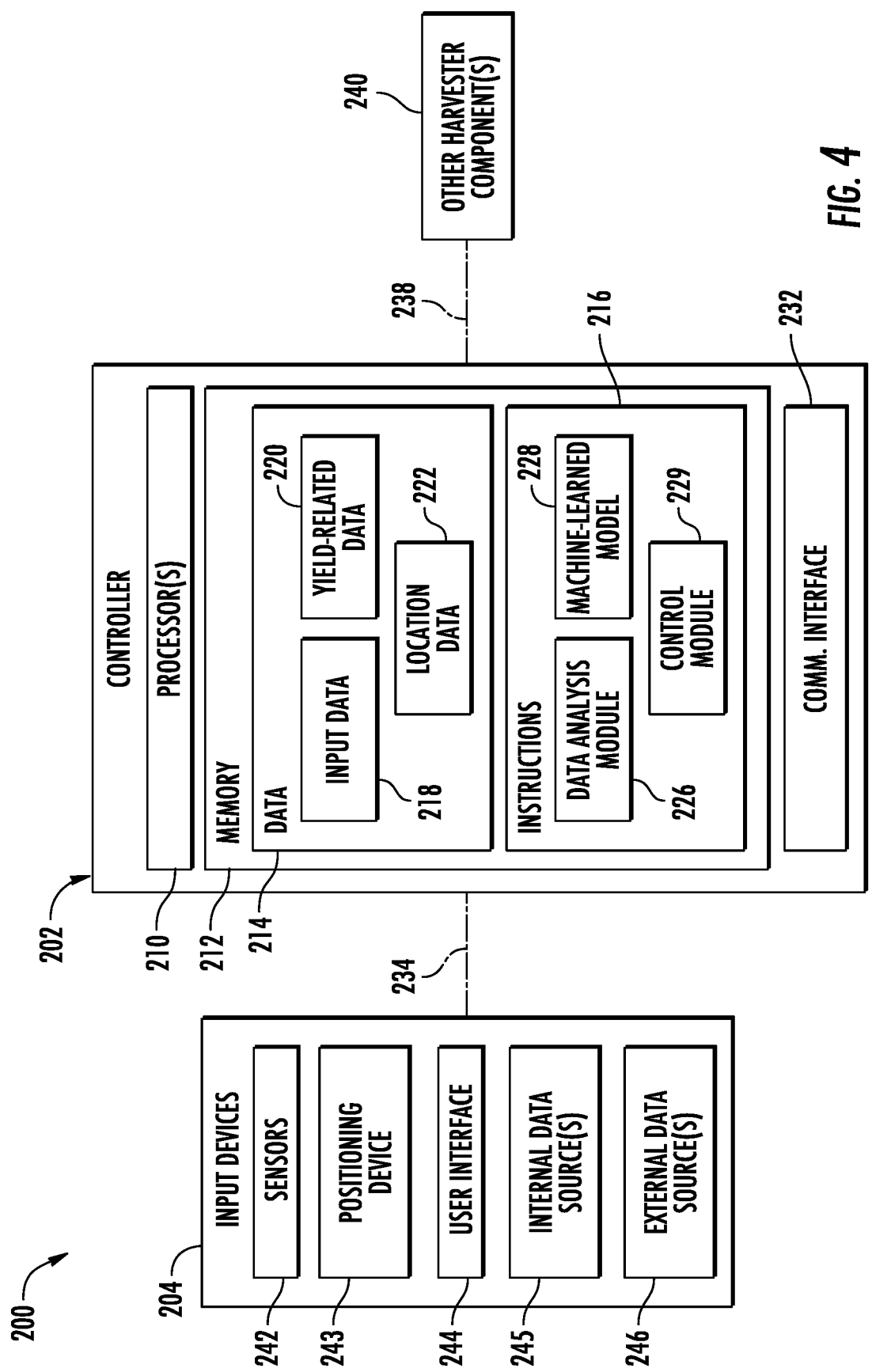
FIG. 4 illustrates a schematic view of one embodiment of a computing system for estimating crop yield in accordance with aspects of the present subject matter.
Figure 5:
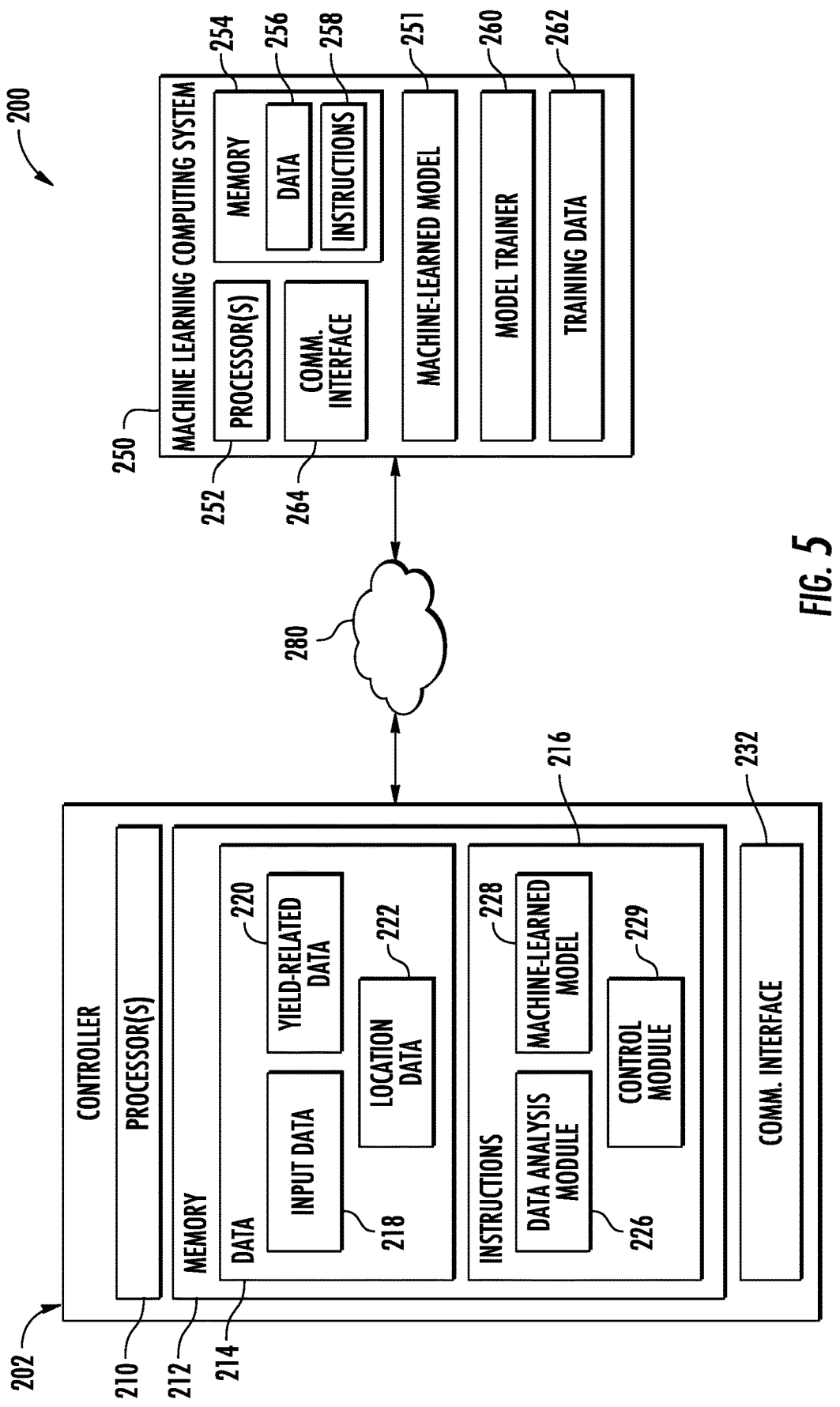
FIG. 5 illustrates a schematic view of another embodiment of a computing system for estimating crop yield in accordance with aspects of the present subject matter.

Referring now to FIGS. 4 and 5, schematic views of embodiments of a computing system 200 are illustrated in accordance with aspects of the present subject matter. In general, the system 200 will be described herein with reference to the harvester 10 described above with reference to FIGS. 1-3B. However, it should be appreciated that the disclosed system 200 may generally be utilized with harvesters having any suitable harvester configuration.

In several embodiments, the system 200 may include a controller 202 and various other components configured to be communicatively coupled to and/or controlled by the controller 202, such as various input devices 204 and/or various components of the harvester 10. In some embodiments, the controller 202 is physically coupled to the harvester 10. In other embodiments, the controller 202 is not physically coupled to the harvester 10 (e.g., the controller 202 may be remotely located from the harvester 10) and instead may communicate with the harvester 10 over a wireless network.

As will be described in greater detail below, the controller 202 may be configured to leverage a machine-learned model 228 to determine one or more yield-related parameters for an agricultural harvester (e.g., a mass flow rate through the harvester) based on input data that is related, for instance, to one or more operation-related conditions associated with the harvester. In particular, FIG. 4 illustrates a computing environment in which the controller 202 can operate to determine the yield-related parameter based on input data 218 received, for example, from one or more input devices 204 and, further, to initiate one or more control actions associated with a harvester, such as by controlling one or more electronically controlled components 240 of the harvester (e.g., the engine, transmission, hydraulic system components, material processing system components, etc.) based on the yield-related data 220. That is, FIG. 4 illustrates a computing environment in which the controller 202 is actively used in conjunction with a harvester (e.g., during operation of the harvester within a field). As will be discussed further below, FIG. 5 depicts a computing environment in which the controller 202 can communicate over a network 280 with a machine learning computing system 250 to train and/or receive a machine-learned model 228. Thus, FIG. 5 illustrates operation of the controller 202 to train a machine-learned model 228 and/or to receive a trained machine-learned model 228 from a machine learning computing system 250 (e.g., FIG. 5 shows the "training stage") while FIG. 4 illustrates operation of the controller 202 to use the machine-learned model 228 to actively determine a yield-related parameter(s) for the harvester (e.g., FIG. 4 shows the "inference stage").

Referring first to FIG. 4, in general, the controller 202 may correspond to any suitable processor-based device(s), such as a computing device or any combination of computing devices. Thus, as shown in FIG. 4, the controller 202 may generally include one or more processor(s) 210 and associated memory devices 212 configured to perform a variety of computer-implemented functions (e.g., performing the methods, steps, algorithms, calculations and the like disclosed herein). As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory 212 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory 212 may generally be configured to store information accessible to the processor(s) 210, including data 214 that can be retrieved, manipulated, created and/or stored by the processor(s) 210 and instructions 216 that can be executed by the processor(s) 210.

In several embodiments, the data 214 may be stored in one or more databases. For example, the memory 212 may include an input database 218 for storing input data received from the input device(s) 204. For example, the input device(s) may include one or more sensors 242 configured to monitor one or more parameters and/or conditions associated with the harvester 10 and/or the operation being performed therewith (e.g., including one or more of the various sensors 90, 92, 94, 96, 98 described above), one or more positioning device(s) 243 for generating position data associated with the location of the harvester 10, one or more user interfaces 244 for allowing operator inputs to be provided to the controller 202 (e.g., buttons, knobs, dials, levers, joysticks, touch screens, and/or the like), one or more other internal data sources 245 associated with the harvester 10 (e.g., other devices, databases, etc.), one or more external data sources 246 (e.g., a remote computing device or sever, including, for instance, the machine-learning computing system 250 of FIG. 5), and/or any other suitable input device(s) 204. The data received from the input device(s) 204 may, for example, stored within the input database 218 for subsequent processing and/or analysis.

In several embodiments, the controller 202 may be configured to receive data from the input device(s) 204 that is associated with one or more "operation-related" conditions. The operation-related condition data may, for example, be: based directly or indirectly on sensor data received from the sensors 242 and/or the location data received from the positioning device(s) 243; calculated or determined by the controller 202 based on any data accessible to the system 200 (e.g., including data accessed, received, or transmitted from internal data sources 245 and/or external data sources 246); received from the operator (e.g., via the user interface); and/or the like. As indicated above, operation-related conditions may include, but are not limited to, operational parameters and/or settings of the harvester (e.g., sensed or calculated operational parameters or operator-selected settings), vehicle commands for the harvester, vehicle configuration parameters, application-related parameters, field-related parameters, and/or the like. For instance, examples of operation-related conditions include, but are not limited to, engine speed, ground speed, elevator speed, base cutter height, base cutter pressure, chopper speed, chopper pressure, floating roller position or displacement, the vertical position or travel of the chassis or frame, the fan speed associated with the primary and/or secondary extractor, hydraulic motor usage, foilage proportion, base cutter direction (forward or reverse), raising or lowering of the topper assembly, raising or lowering of the suspension, the model/type of the chopper assembly, the size of the elevator assembly, tire/track parameters, the region within which the harvester is operating, farm-specific parameters, time-related parameters (day/night), humidity data, field NDVI data, yield prediction data, soil analysis data, and/or the like.

It should be appreciated that, in addition to being considered an input device(s) that allows an operator to provide inputs to the controller 202, the user interface 244 may also function as an output device. Specifically, the user interface 244 may be configured to allow the controller 202 to provide feedback to the operator (e.g., visual feedback via a display or other presentation device, audio feedback via a speaker or other audio output device, and/or the like).

Additionally, as shown in FIG. 4, the memory 212 may include a yield-related database 220 for storing information or data associated with the yield-related parameter(s) for the harvester 10. For example, as indicated above, based on the input data received from the input device(s) 204, the controller 202 may be configured to estimate or calculate one or more values for yield-related parameters associated with the harvester, such as a value(s) for the mass flow rate of the harvested materials through the harvester 10. The yield-related parameter value(s) estimated or calculated by the controller 202 may then be stored within the yield-related database 220 for subsequent processing and/or analysis.

Moreover, in several embodiments, the memory 212 may also include a location database 222 storing location information about the harvester 10 and/or information about the field being processed (e.g., a field map). Such location database 222 may, for example, correspond to a separate database or may form part of the input database 218. As shown in FIG. 4, the controller 202 may be communicatively coupled to a positioning device(s) 243 installed on or within the harvester 10. For example, in one embodiment, the positioning device(s) 243 may be configured to determine the exact location of the harvester 10 using a satellite navigation position system (e.g., a GPS system, a Galileo positioning system, the Global Navigation satellite system (GLONASS), the BeiDou Satellite Navigation and Positioning system, and/or the like). In such an embodiment, the location determined by the positioning device(s) 243 may be transmitted to the controller 202 (e.g., in the form of coordinates) and subsequently stored within the location database 222 for subsequent processing and/or analysis.

Additionally, in several embodiments, the location data stored within the location database 222 may also be correlated to all or a portion of the input data stored within the input database 218. For instance, in one embodiment, the location coordinates derived from the positioning device(s) 243 and the data received from the input device(s) 204 may both be time-stamped. In such an embodiment, the time-stamped data may allow the data received from the input device(s) 204 to be matched or correlated to a corresponding set of location coordinates received from the positioning device(s) 243, thereby allowing the precise location of the portion of the field associated with the input data to be known (or at least capable of calculation) by the controller 202.

Moreover, by matching the input data to a corresponding set of location coordinates, the controller 202 may also be configured to generate or update a corresponding field map associated with the field being processed. For example, in instances in which the controller 202 already includes a field map stored within its memory 212 that includes location coordinates associated with various points across the field, the input data received from the input device(s) 204 may be mapped or correlated to a given location within the field map. Alternatively, based on the location data and the associated image data, the controller 202 may be configured to generate a field map for the field that includes the geo-located input data associated therewith.

Likewise, any yield-related parameter derived from a particular set of input data (e.g., a set of input data received at a given time or within a given time period) can also be matched to a corresponding set of location coordinates. For example, the particular location data associated with a particular set of input data can simply be inherited by any yield-related data produced on the basis of or otherwise derived from such set of input data 118. Thus, based on the location data and the associated yield-related data, the controller 202 may be configured to generate a field map for the field that describes, for each analyzed portion of the field, one or more corresponding yield-related parameter values, such as one or more mass flow rate values. Such a map can be consulted to identify discrepancies in or other characteristics of the yield-related parameter at or among various granular locations within the field.

Referring still to FIG. 4, in several embodiments, the instructions 216 stored within the memory 212 of the controller 202 may be executed by the processor(s) 210 to implement a data analysis module 226. In general, the data analysis module 226 may be configured to analyze the input data to determine the yield-related parameter. In particular, as will be discussed further below, the data analysis module 226 can cooperatively operate with or otherwise leverage a machine-learned model 228 to analyze the input data 118 to determine the yield-related parameter. As an example, the data analysis module 226 can perform some or all of method 300 of FIG. 7.

Moreover, as shown in FIG. 4, the instructions 216 stored within the memory 212 of the controller 202 may also be executed by the processor(s) 210 to implement a machine-learned model 228. In particular, the machine-learned model 228 may be a machine-learned yield estimation model. The machine-learned yield estimation model 228 can be configured to receive input data and to process the data to determine one or more yield-related parameters associated with the current harvesting operation being performed by the harvester 10.

Referring still to FIG. 4, the instructions 216 stored within the memory 212 of the controller 202 may also be executed by the processor(s) 110 to implement a control module 229. In general, the control module 229 may be configured to adjust the operation of the harvester 10 by controlling one or more components 240 of the harvester 10. Specifically, in several embodiments, the control module 229 may be configured to automatically control the operation of one or more harvester components 240 based at least in part on the yield-related parameter determined as a function of the input data. Thus, the system 200 can reactively manage various operational parameters of the harvester 10 based on the value(s) of the yield-related parameter that is output, for instance, from the machine-learned yield estimation model 228.

For instance, as indicated above, in one embodiment, the yield-related parameter may correspond to the mass flow rate of the harvested materials through the harvester 10. In such an embodiment, if the mass flow rate is higher than expected, the operational settings of one or more components 240 of the harvester 10 may, for example, be automatically adjusted to accommodate the increased mass flow through system. Similarly, if the mass flow rate is lower than expected, the operational settings of one or more components 240 of the harvester 10 may, for example, be automatically adjusted to accommodate the reduced mass flow through system. For instance, the controller 202 may be configured to automatically adjust the ground speed of the harvester 10 (e.g., by automatically controlling the operation of the engine, transmission, and/or braking system of the harvester 10), the fan speed associated with one or more both extractors 54, 78 (e.g., by automatically controlling the operation of the associated fan 56, 80), the elevator speed (e.g., by automatically controlling the operation of the elevator motor 76), and/or any other suitable operational settings to accommodate variations in the mass flow through the system.

In addition to such automatic control of the harvester operation, the controller 202 may also be configured to initiate one or more other control actions associated with or related to the yield-related parameter determined using the machine-learned model. For instance, in several embodiments, the controller 202 may automatically control the operation of the user interface 244 to provide an operator notification associated with the determined yield-related parameter. Specifically, in one embodiment, the controller 202 may control the operation of the user interface 244 in a manner that causes data associated with the determined yield-related parameter to be presented to the operator of the harvester 10, such as by presenting raw or processed data associated with the yield-related parameter including numerical values, graphs, maps, and/or any other suitable visual indicators.

Additionally, in some embodiments, the control action initiated by the controller 202 may be associated with the generation of a yield map based at least in part on the values for the yield-related parameter output from the machine-learned model. For instance, as indicated above, the location coordinates derived from the positioning device(s) 243 and the yield-related data may both be time-stamped. In such an embodiment, the time-stamped data may allow each yield-related parameter value or datapoint to be matched or correlated to a corresponding set of location coordinates received from the positioning device(s) 243, thereby allowing the precise location of the portion of the field associated with the value/datapoint to be determined by the controller 202. The resulting yield map may, for example, simply correspond to a data table that maps or correlates each yield-related datapoint to an associated field location. Alternatively, the yield map may be presented as a geo-spatial mapping of the yield-related data, such as a heat map that indicates the variability in the yield-related parameter across the field.

Moreover, as shown in FIG. 4, the controller 202 may also include a communications interface 232 to provide a means for the controller 202 to communicate with any of the various other system components described herein. For instance, one or more communicative links or interfaces 234 (e.g., one or more data buses and/or wireless connections) may be provided between the communications interface 232 and the input device(s) 204 to allow data transmitted from the input device(s) 204 to be received by the controller 202. Additionally, as shown in FIG. 3, one or more communicative links or interfaces 238 (e.g., one or more data buses and/or wireless connections) may be provided between the communications interface 232 and one or more electronically controlled components 240 of the harvester 10 to allow the controller 202 to control the operation of such system components.

Referring now to FIG. 5, according to an aspect of the present disclosure, the controller 202 can store or include one or more machine-learned models 228. In particular, the machine-learned model 228 may be a machine-learned yield estimation model. The machine-learned yield estimation model 228 can be configured to receive input data and to process the input data to determine one or more yield-related parameters associated with the harvester 10.

As on example, the yield estimation model can correspond to a linear machine-learned model. For instance, in one embodiment, the yield estimation model may be or include a linear regression model. A linear regression model may be used to intake the input data from the input device(s) 204 and provide a continuous, numeric output value for the yield-related parameter. Linear regression models may rely on various different techniques, such as ordinary least squares, ridge regression, lasso, gradient descent, and/or the like. However, in other embodiments, the yield estimation model may be or include any other suitable linear machine-learned model.

Alternatively, the yield estimation model may correspond to a non-linear machine-learned model. For instance, in one embodiment, the yield estimation model may be or include a neural network such as, for example, a convolutional neural network. Example neural networks include feed-forward neural networks, recurrent neural networks (e.g., long short-term memory recurrent neural networks), convolutional neural networks, transformer neural networks (or any other models that perform self-attention), or other forms of neural networks. Neural networks can include multiple connected layers of neurons and networks with one or more hidden layers, which can be referred to as "deep" neural networks. Typically, at least some of the neurons in a neural network include non-linear activation functions.

As further examples, the yield estimation model can be or can otherwise include various other machine-learned models, such as a support vector machine; one or more decision-tree based models (e.g., random forest models); a Bayes classifier; a K-nearest neighbor classifier; and/or other types of models including both linear models and non-linear models.

In some embodiments, the controller 202 can receive the one or more machine-learned models 228 from the machine learning computing system 250 over network 280 and can store the one or more machine-learned models 228 in the memory 212. The controller 202 can then use or otherwise run the one or more machine-learned models 228 (e.g., by processor(s) 210).

The machine learning computing system 250 includes one or more processors 252 and a memory 254. The one or more processors 252 can be any suitable processing device such as described with reference to processor(s) 210. The memory 254 can include any suitable storage device such as described with reference to memory 212.

The memory 254 can store information that can be accessed by the one or more processors 252. For instance, the memory 254 (e.g., one or more non-transitory computer-readable storage mediums, memory devices) can store data 256 that can be obtained, received, accessed, written, manipulated, created, and/or stored. In some embodiments, the machine learning computing system 250 can obtain data from one or more memory device(s) that are remote from the system 250.

The memory 254 can also store computer-readable instructions 258 that can be executed by the one or more processors 252. The instructions 258 can be software written in any suitable programming language or can be implemented in hardware. Additionally, or alternatively, the instructions 258 can be executed in logically and/or virtually separate threads on processor(s) 252.

For example, the memory 254 can store instructions 258 that when executed by the one or more processors 252 cause the one or more processors 252 to perform any of the operations and/or functions described herein.

In some embodiments, the machine learning computing system 250 includes one or more server computing devices. If the machine learning computing system 250 includes multiple server computing devices, such server computing devices can operate according to various computing architectures, including, for example, sequential computing architectures, parallel computing architectures, or some combination thereof.

In addition or alternatively to the model(s) 228 at the controller 202, the machine learning computing system 250 can include one or more machine-learned models 251. For example, the models 251 can be the same as described above with reference to the model(s) 228.

In some embodiments, the machine learning computing system 250 can communicate with the controller 202 according to a client-server relationship. For example, the machine learning computing system 250 can implement the machine-learned models 251 to provide a web-based service to the controller 202. For example, the web-based service can provide data analysis for determining yield-related parameters as a service.

Thus, machine-learned models 228 can be located and used at the controller 202 and/or machine-learned models 251 can be located and used at the machine learning computing system 250.

In some embodiments, the machine learning computing system 250 and/or the controller 202 can train the machine-learned models 228 and/or 251 through use of a model trainer 260. The model trainer 260 can train the machine-learned models 228 and/or 251 using one or more training or learning algorithms. One example training technique is backwards propagation of errors ("backpropagation"). Gradient-based (e.g., gradient-descent) or other training techniques can be used.

In some embodiments, the model trainer 260 can perform supervised training techniques using a set of training data 262. For example, the training data 262 can include input data from the input device(s) 204 that is associated with a known value for the target parameter (i.e., the yield-related parameter). For instance, input data associated with the training dataset may be continuously collected, generated, and/or received while the yield-related parameter is being monitored via a separate yield monitoring means to provide matching or correlation datasets between the input data and the yield-related data. In other embodiments, the model trainer 260 can perform unsupervised training techniques. The model trainer 260 can perform a number of generalization techniques to improve the generalization capability of the models being trained. Generalization techniques include weight decays, dropouts, or other techniques. The model trainer 260 can be implemented in hardware, software, firmware, or combinations thereof.

Thus, in some embodiments, the models can be trained at a centralized computing system (e.g., at "the factory") and then distributed to (e.g., transferred to for storage by) specific controllers. Additionally or alternatively, the models can be trained (or re-trained) based on additional training data generated by users of the system. This process may be referred to as "personalization" of the models and may allow users to further train the models to provide improved (e.g., more accurate) predictions for unique field and/or machine conditions experienced by such users.

The network(s) 280 can be any type of network or combination of networks that allows for communication between devices. In some embodiments, the network(s) can include one or more of a local area network, wide area network, the Internet, secure network, cellular network, mesh network, peer-to-peer communication link and/or some combination thereof and can include any number of wired or wireless links. Communication over the network(s) 280 can be accomplished, for instance, via a communications interface using any type of protocol, protection scheme, encoding, format, packaging, etc.

The machine learning computing system 250 may also include a communications interface 264 to communicate with any of the various other system components described herein.

FIGS. 4 and 5 illustrate example computing systems that can be used to implement the present disclosure. Other computing systems can be used as well. For example, in some embodiments, the controller 202 can include the model trainer 260 and the training dataset 262. In such embodiments, the machine-learned models 228 can be both trained and used locally at the controller 202. As another example, in some embodiments, the controller 202 is not connected to other computing systems.

Figure 6:
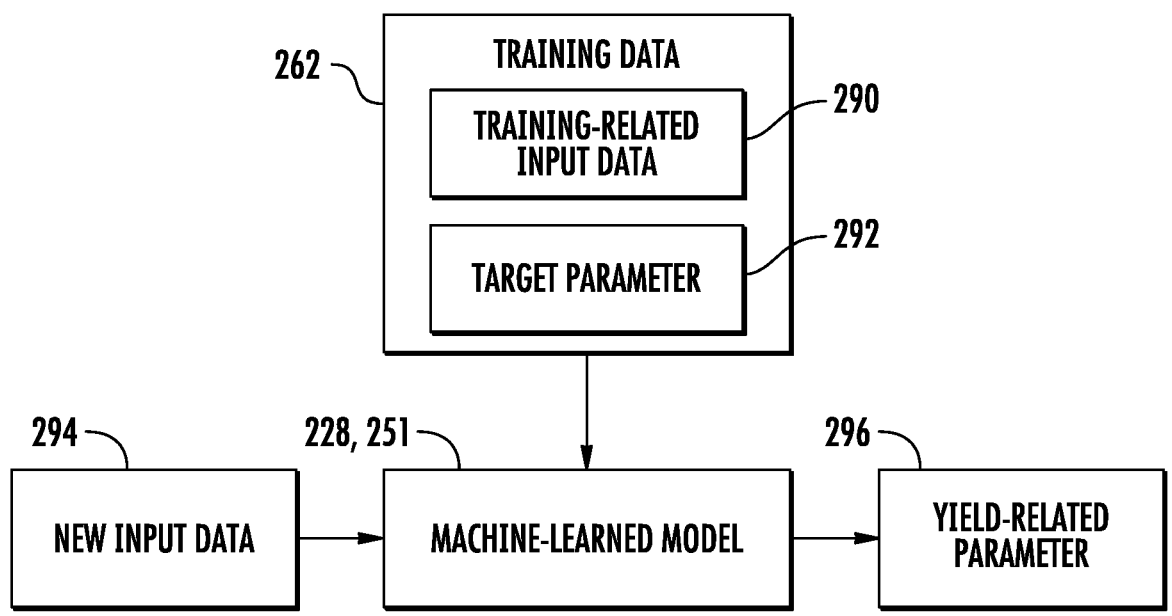
FIG. 6 illustrates a schematic view of one embodiment of an exemplary flow diagram for training a machine-learned model.

Referring now to FIG. 6, a schematic view illustrating an exemplary flow diagram for training a machine-learned model, such as the machine-learned yield estimation models 228, 251 described above, is illustrated in accordance with aspects of the present subject matter. As indicated above, the model(s) 228, 251 can be trained by a model trainer 260 that uses training data 262 and performs any suitable supervised and/or unsupervised training techniques. In several embodiments, as shown in FIG. 6, the model(s) 228, 251 may be trained using one or more training datasets including input data 290 that is associated with a known value for the target parameter 292 (i.e., the yield-related parameter). For instance, in one embodiment, the input data 290 associated with the training dataset may be continuously collected, generated, and/or received (e.g., via the input device(s) 204) while both an agricultural harvester is performing a harvesting operation within the field and the target yield-related parameter 292 is being monitored via a separate yield monitoring means (e.g., by using a conventional yield monitoring system that relies upon a sensorized load plate within the elevator assembly to monitor, for example, the mass flow rate through the elevator).

By analyzing the input data 290 in combination with the known or target values 292 for the yield-related parameter derived from the separate yield monitoring means, suitable correlations may be established between the input data (including certain subsets of the input data) and the yield-related parameter to develop a machine-learned model that can accurately predict the yield-related parameter based on new datasets including the same type of input data. For instance, in one implementation, suitable correlations may be established between the yield-related parameter and various operation-related conditions associated with or included within the input data, such as various sensed, calculated, and/or known parameters, settings, machine configurations, and/or operational statuses associated with the harvester (e.g., engine speed, ground speed, elevator speed, base cutter height, base cutter pressure, chopper speed, chopper pressure, floating roller position or displacement, the vertical position or travel of the chassis or frame, the fan speed associated with the primary and/or secondary extractor, hydraulic motor usage, base cutter direction (forward or reverse), whether the topper assembly or suspension is being currently raised or lowered, the model/type of the chopper assembly, the size of the elevator assembly, tire/track parameters, and/or the like). As indicated above, in addition to using such harvester-based, operation-related conditions to establish the desired correlations (or as an alternative thereto), suitable correlations may also be established between the yield-related parameter and various other operation-related conditions, such as field-based or application-based operation-related conditions (e.g., conditions specific to the region within which the harvester is operating, farm-specific parameters, time-related parameters (day/night), humidity data, field NDVI data, yield prediction data, soil analysis data, and/or the like).

As shown in FIG. 6, once the machine-learned model has been trained, new datasets 294 can be input into the model to allow the model to predict or determine new estimated values 296 for the target yield-related parameter. For instance, upon training the model, the input data collected, generated, and/or received during a subsequent harvesting operation can be input into the model to provide yield-related data associated with such harvesting operation. Specifically, in one embodiment, the model may be used to predict or determine values for the yield-related parameter at a given frequency (e.g., the frequency at which new input data is being received) to allow such parameter to be continuously monitored as the harvesting operation is being conducted. As indicated above, such yield-related data may then be used by the computing system 200 to generate an associated field map (e.g., a yield map), to present yield information to the operator (e.g., via the user interface 244), to automatically control the operation of the harvester 10, and/or to execute any other suitable control actions.

Figure 7:
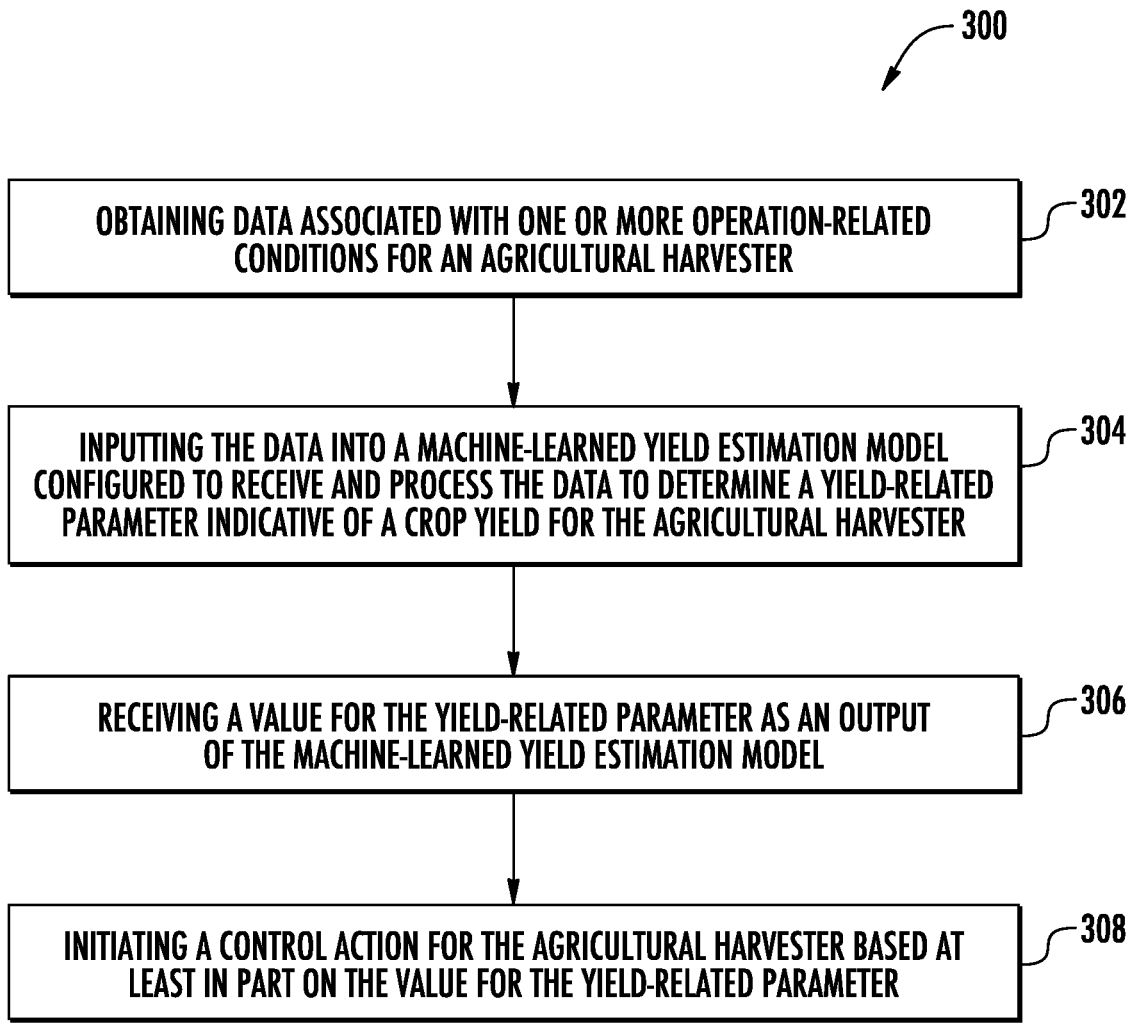
FIG. 7 illustrates a flow diagram of one embodiment of a method for estimating a crop yield for an agricultural harvester in accordance with aspects of the present subject matter.

Referring now to FIG. 7, a flow diagram of one embodiment of a method 300 for estimating crop yield for an agricultural harvester is illustrated in accordance with aspects of the present subject matter. In general, the method 300 will be described herein with reference to the agricultural harvester 10 and related components described with reference to FIGS. 1-3B, and the various components of the system 200 described with reference to FIGS. 4 and 5. However, it should be appreciated that the disclosed method 300 may be implemented with harvesters having any other suitable configurations and/or within systems having any other suitable system configuration. In addition, although FIG. 7 depicts steps performed in a particular order for purposes of illustration and discussion, the methods discussed herein are not limited to any particular order or arrangement. One skilled in the art, using the disclosures provided herein, will appreciate that various steps of the method disclosed herein can be omitted, rearranged, combined, and/or adapted in various ways without deviating from the scope of the present disclosure.

As shown in FIG. 5, at (302), the method 300 may include obtaining data associated with one or more operation-related conditions for an agricultural harvester. For instance, as described above, the controller 202 may be communicatively coupled to one or more input devices 204 configured to collect or generate data associated with one or more operation-related conditions for an agricultural harvester, thereby allowing the data collected or generated by such device(s) to be transmitted to the controller 202. As indicated above, operation-related conditions can include, but are not limited to, operational parameters and settings of the harvester (e.g., sensed or calculated operational parameters or operator-selected settings), vehicle commands for the harvester, vehicle configuration parameters, application-related parameters, field-related parameters, and/or the like. For instance, operation-related condition data may include, but is not limited to, data associated with any one or a combination of the engine speed, ground speed, elevator speed, base cutter height, base cutter pressure, chopper speed, chopper pressure, floating roller position or displacement, the vertical position or travel of the chassis or frame, the fan speed associated with the primary and/or secondary extractor, hydraulic motor usage, foilage proportion, base cutter direction (forward or reverse), raising or lowering of the topper assembly, raising or lowering of the suspension, the model/type of the chopper assembly, the size of the elevator assembly, tire/track parameters, the region within which the harvester is operating, farm-specific parameters, time-related parameters (day/night), humidity data, field NDVI data, yield prediction data, soil analysis data, and/or the like.

In some embodiments, the input data may correspond to a dataset collected or generated at a given time, such as by including instantaneously sensed or calculated operating parameters of the harvester 10 as the harvester 10 is performing a harvesting operation within a field. Thus, in some embodiments, the method 300 can be performed iteratively for each new input dataset as such dataset is received. For example, the method 300 can be performed iteratively in real-time as new data is received from the input devices 204 while harvester 10 is moved throughout the field. As an example, the method 300 can be performed iteratively in real-time as new sensor data is received from the sensors 242 that are physically located on the harvester 10.

Additionally, at (304), the method 300 may include inputting the data into a machine-learned yield estimation model configured to receive and process the data to determine a yield-related parameter indicative of a crop yield for the agricultural harvester. Specifically, as indicated above, the controller 202 may be configured to leverage a machine-learned model that is configured to receive and process input data associated with one or more operation-related conditions for the agricultural harvester to determine a yield-related parameter indicative of the crop yield for the harvester. For instance, in several embodiments, the machine-learned model may be configured to determine the mass flow rate of the harvested materials being directed through a portion of the harvester based on the data input into the model.

In some embodiments, the inputted data can correspond to or otherwise include an entirety of the input dataset, such that all of the input data received from the input devices 204 is analyzed. In other embodiments, the inputted data can correspond to or otherwise include only a portion or subset of the input data received from the input devices 204. Using only a subset of the image data can enable reductions in processing time and requirements.

Additionally, at (306), the method 300 may include receiving a value for the yield-related parameter as an output of the machine-learned yield estimation model. Specifically, the machine-learned model may be configured to output a numerical value for the yield-related parameter based on the data input into the model, such as by outputting a numerical value for the mass flow rate of the harvested materials being directed through the harvester Referring still to FIG. 7, at (308), the method 300 may include initiating a control action for the agricultural harvester based at least in part on the value for the yield-related parameter. For example, as indicated above, the controller 202 may be configured to initiate any number of control actions in association with the determined yield-related parameter, including, but not limited to, presenting data associated with the yield-related parameter to the operator via the associated user interface 244, generating a yield map based at least in part on the determined yield-related parameter and/or automatically controlling the operation of a component of the harvester 10 based at least in part on the determined yield-related parameter.

It is to be understood that the steps of the method 300 are performed by the computing system 200 upon loading and executing software code or instructions which are tangibly stored on a tangible computer readable medium, such as on a magnetic medium, e.g., a computer hard drive, an optical medium, e.g., an optical disk, solid-state memory, e.g., flash memory, or other storage media known in the art. Thus, any of the functionality performed by the computing system 200 described herein, such as the method 300, is implemented in software code or instructions which are tangibly stored on a tangible computer readable medium. The computing system 200 loads the software code or instructions via a direct interface with the computer readable medium or via a wired and/or wireless network. Upon loading and executing such software code or instructions by the computing system 200, the computing system 200 may perform any of the functionality of the computing system 200 described herein, including any steps of the method 300 described herein.

The term "software code" or "code" used herein refers to any instructions or set of instructions that influence the operation of a computer or computing system. They may exist in a computer-executable form, such as machine code, which is the set of instructions and data directly executed by a computer's central processing unit or by a computing system, a human-understandable form, such as source code, which may be compiled in order to be executed by a computer's central processing unit or by a computing system, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a computing system.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A computing system for estimating crop yields for agricultural harvesters, the computing system comprising:
   one or more processors; and
   one or more non-transitory computer-readable media that collectively store:
      a machine-learned yield estimation model configured to receive data associated with one or more operation-related conditions for an agricultural harvester and process the data to determine a yield-related parameter indicative of a crop yield for the agricultural harvester, wherein the yield-related parameter comprises a mass flow rate through a portion of the agricultural harvester; and
      instructions that, when executed by the one or more processors, configure the computing system to perform operations, the operations comprising:
         obtaining the data associated with one or more operation-related conditions;
         inputting the data into the machine-learned yield estimation model; and
         receiving a value for the yield-related parameter as an output of the machine-learned yield estimation model.

2. The computing system of claim 1, wherein:
   the computing system is physically located on the agricultural harvester; and
   obtaining the data associated with one or more operation-related conditions comprises obtaining data associated with the one or more operation-related conditions from a source physically located on the agricultural harvester.

3. The computing system of claim 1, wherein:
   the computing system is physically located on the agricultural harvester; and
   obtaining the data associated with one or more operation-related conditions comprises obtaining data associated with the one or more operation-related conditions from a source located remote from the agricultural harvester.

4. The computing system of claim 1, wherein the operations further comprise initiating a control action for the agricultural harvester based at least in part on the yield-related parameter.

5. The computing system of claim 4, wherein initiating the control action comprises at least one of:
   causing data associated with the yield-related parameter to be presented to an operator via a user interface of the agricultural harvester;
   generating a yield map based at least in part on the yield-related parameter; or automatically controlling an operation of a component of the agricultural harvester based at least in part on the yield-related parameter.

6. The computing system of claim 1, wherein the portion of the agricultural harvester is an elevator assembly of the agricultural harvester.

7. The computing system of claim 1, wherein obtaining the data associated with one or more operation-related conditions comprises obtaining sensor data from one or more sensors physically located on the agricultural harvester.

8. The computing system of claim 7, wherein the sensor data is indicative of at least one of:
   a position or change in position of one or more components of the agricultural harvester;
   a ground speed of the agricultural harvester;
   an operational speed of one or more components of the agricultural harvester;
   a fluid pressure of hydraulic fluid within the agricultural harvester; or
   a load applied to one or more components of the agricultural harvester.

9. A computer-implemented method for estimating crop yield, the computer-implemented method comprising:
   obtaining, by a computing system comprising one or more computing devices, data associated with one or more operation-related conditions for an agricultural harvester;
   inputting, by the computing system, the data into a machine-learned yield estimation model configured to receive and process the data to determine a yield-related parameter indicative of a crop yield for the agricultural harvester, wherein the yield-related parameter comprises a mass flow rate through a portion of the agricultural harvester;

receiving, by the computing system, a value for the yield-related parameter as an output of the machine-learned yield estimation model; and initiating, by the computing system, a control action for the agricultural harvester based at least in part on the yield-related parameter.

10. The computer-implemented method of claim 9, wherein:

the computing system is physically located on the agricultural harvester; and obtaining the data associated with one or more operation-related conditions comprises obtaining data associated with the one or more operation-related conditions from a source physically located on the agricultural harvester.

11. The computer-implemented method of claim 9, wherein:

the computing system is physically located on the agricultural harvester; and obtaining the data associated with one or more operation-related conditions comprises obtaining data associated with the one or more operation-related conditions from a source located remote from the agricultural harvester.

12. The computer-implemented method of claim 9, wherein initiating the control action comprises causing data associated with the yield-related parameter to be presented to an operator via a user interface of the agricultural harvester.

13. The computer-implemented method of claim 9, wherein initiating the control action comprises generating a yield map based at least in part on the yield-related parameter.

14. The computer-implemented method of claim 9, wherein initiating the control action comprises automatically controlling an operation of a component of the agricultural harvester based at least in part on the yield-related parameter.

15. The computer-implement method of claim 9, wherein the portion of the agricultural harvester is an elevator assembly of the agricultural harvester.

16. The computer-implement method of claim 9, wherein obtaining the data associated with one or more operation-related conditions comprises obtaining sensor data from one or more sensors physically located on the agricultural harvester.

17. The computer-implement method of claim 16, wherein the sensor data is indicative of at least one of:

a position or change in position of one or more components of the agricultural harvester;

a ground speed of the agricultural harvester;

an operational speed of one or more components of the agricultural harvester;

a fluid pressure of hydraulic fluid within the agricultural harvester; or a load applied to one or more components of the agricultural harvester.

18. An agricultural harvester, comprising:

a frame;

a material processing system supported relative to the frame and being configured to process a flow of harvested materials; and a controller comprising one or more processors and one or more non-transitory computer-readable media that collectively store:

a machine-learned yield estimation model configured to receive data associated with one or more operation-related conditions for the agricultural harvester and process the data to determine a yield-related parameter, the yield-related parameter comprising a mass flow rate of the harvested materials through a portion of the agricultural harvester; and instructions that, when executed by the one or more processors, configure the controller to perform operations, the operations comprising:

obtaining the data associated with one or more operation-related conditions;

inputting the data into the machine-learned yield estimation model; and receiving a value for the yield-related parameter as an output of the machine-learned yield estimation model.

19. The agricultural harvester of claim 18, wherein the operations further comprise initiating a control action for the agricultural harvester based at least in part on the value for the yield-related parameter.

20. The agricultural harvester of claim 18, further comprising one or more sensors physically located on the agricultural harvester, wherein obtaining the data associated with one or more operation-related conditions comprises obtaining sensor data from the one or more sensors; and wherein the sensor data is indicative of at least one of:

a position or change in position of one or more components of the agricultural harvester;

a ground speed of the agricultural harvester;

an operational speed of one or more components of the agricultural harvester;

a fluid pressure of hydraulic fluid within the agricultural harvester; or a load applied to one or more components of the agricultural harvester.

* * * * *